3,053,556
IDLER ARM BALL JOINT
David E. Klocke, Oak Park, and Vincent J. Ryszewski, Detroit, Mich., assignors to Chrysler Corporation, Highland Park, Mich., a corporation of Delaware
Filed Mar. 7, 1960, Ser. No. 13,201
4 Claims. (Cl. 287—87)

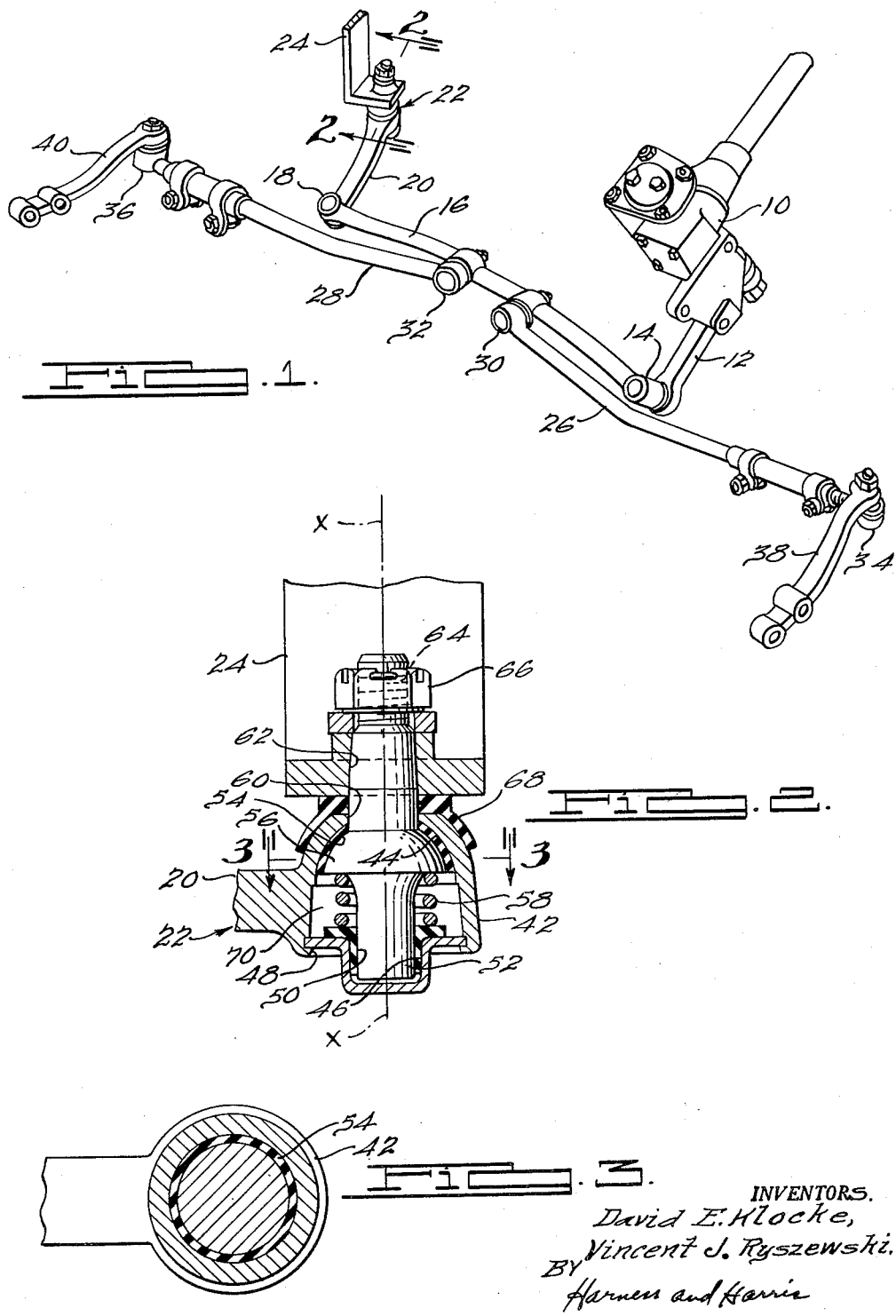

This invention relates to ball type joints of the type finding application in mounting the idler arm of the steering or front end linkage to a vehicle frame.

A problem exists in the vehicle industry of providing a suitable ball type joint for mounting the idler arm since this joint is subjected to considerable movement and wear of the parts results in a vibration being transmitted to the steering wheel. These vibrations occur mainly from wheel deflections which cause the worn idler arm ball joints to allow motion of the idler arm in directions other than about its predetermined pivotal axis.

Heretofore these idler arm ball joints have been provide with various types of rubber bushing arrangements to absorb road shock and prevent looseness from occurring in the joints. These rubber arrangements, however, do not have adequate life and will inevitably lead to this looseness and consequent vibration at the steering wheel.

The present invention eliminates these problems by providing a ball type joint with spaced bearing portions in which the idler arm stud pivots and which prevent the stud from pivoting any substantial degree in any direction other than about its pivotal axis. Moreover, this joint is provided with nylon bearing inserts interposed between the mating portions of the stud and joint housing, and since these nylon inserts require very little lubrication as compared to metal to metal contact joints, the life of the joint is considerably increased. A further feature of this invention is that the ball joint housing is constructed in such a manner that the idler arm stud will bottom out against the housing when vertical loads are impressed upon the idler arm by severe wheel deflections.

It is a principal object of this invention to provide a ball type joint having spaced bearing portions providing a predetermined pivotal axis and allowing relative movement of the joint members about only one predetermined pivotal axis.

A further object of this invention is to provide the aforesaid ball joint with nylon bearing inserts to increase the life of the joint through the self-lubricating features of the nylon and through the motion limiting features of the ball joint construction.

Further objects and advantages of the present invention will become apparent from the following description and drawings in which:

FIGURE 1 represents a steering linkage assembly of the type used on motor vehicles;

FIGURE 2 represents a cross sectional view of the idler arm ball joint shown in FIG. 1 taken along the line 2—2 thereof in the direction of the arrows; and FIGURE 3 represents a cross-sectional view of the ball joint of FIGURE 2 taken along the line 3—3 thereof in the direction of the arrows.

Referring to the drawings, a steering gear generally designated 10 and adapted for connection to a steering wheel, not shown, is connected at its output end with a gear arm 12 pivotally mounted at 14 to a center link 16, which is in turn pivotally mounted at 18 to an idler arm 20. The other end of the idler arm is mounted by means of the ball joint 22 of the present invention to a portion of the frame 24 or other rigid portion of the vehicle or other body structure. A pair of tie rods 26 and 28 are pivotally connected at 30 and 32 respectively to the center link 16 and are pivotally connected at 34 and 36 respectively to the knuckle arms 38 and 40, which connect to the rocker arm and king pin assemblies to which the wheels are attached. This structure does not form any part of the present invention and is of a conventional type known to the art.

Referring to FIGURES 2 and 3, the idler arm ball joint of the present invention comprises a housing 42 having an upper substantially hemispherical section 44 and a lower substantially cylindrical section 46. Lower section 46 is conveniently secured to the housing 42 by means of the spun over end portion 48 of said housing. Inserted in cylindrical section 46 is a nylon stud bearing insert 50 providing an annular lower bearing surface for the idler arm stud 52. An upper nylon bearing insert 54 provides an annular upper bearing surface for the curved portion 56 of idler arm stud 52. A spring 58 constantly forces section 56 of the idler arm stud bearing insert 54 and curved section 44 of housing 42 into bearing contact while at the same time maintaining cylindrical bearing insert 50 into the cylindrical section 46. Other plastics of a self lubricating character finding application in the present invention are Teflon, Delrin, and certain polyethylenes as substitutes for nylon.

The idler arm stud 52 extends through an opening 60 in the top of housing 42 and also through an aperture 62 in the bracket or frame 24 and receives on its threaded end 64 a lock nut 66, which is threaded onto end 64 a sufficient amount to draw the ball joint 22 tightly against a seal 68 of neoprene or other oil resistant rubbery material to substantially hermetically seal the interior of the joint and also to prevent the upper portion of the housing 42 from bearing against frame 24.

In actual operation of the joint the interior 70 of housing 42 may be packed with grease to further lengthen the life of the nylon bearing inserts.

It is noted that motion of the idler arm 20 can readily occur about the pivotal axis X—X of FIGURE 2, but very little motion can occur due to movement of the idler arm in an up or down direction. This is so due to the shoulders provided by the opening 60 in the top of the housing and by the cylindrical section 46 of the housing. These shoulder portions are sufficiently spaced to provide substantial moment arms for counteracting the forces tending to move the idler arm in either an up or down direction. In this manner, undue wearing of the ball joint due to ball joint movement in several planes is minimized and the problem of wheel deflection vibrations occuring at the steering wheel are practically eliminated.

We claim:

1. In a joint having a single axis of rotation, a housing forming a portion of said joint and having on its internal surfaces an annular upper bearing surface and an annular lower bearing surface, one of said bearing surfaces comprising a hemispherical segment, and the other of said bearing surfaces comprising a cylinder, stud means with portions in said housing having spaced annular bearing surfaces positioned adjacent said bearing surfaces on said housing, and relatively thin plastic bearing inserts interposed between the bearing surfaces of said housing and the bearing surfaces of said stud means, said axis of rotation being coaxial with the axis of generation of said annular bearing surfaces of said housing and said stud means.

2. In a joint having a single axis of rotation, a housing forming a portion of said joint and having on its internal surfaces an annular upper bearing surface and an annular lower bearing surface, one of said bearing surfaces comprising a hemispherical segment, and the other of said bearing surfaces comprising a cylinder, stud means with portions in said housing having mating annular bearing surfaces positioned adjacent said bearing surfaces on said housing, and relatively thin self lubricating bearing inserts interposed between the bearing surfaces of said housing and the bearing surfaces of said stud means, said axis of rotation being coaxial with the axis of generation of said annular bearing surfaces of said housing and said stud means, and stop means on said housing to minimize rotation of said stud about any other axis.

3. In a joint having a single axis of rotation, a housing forming a portion of said joint and having on its internal surfaces an annular upper bearing surface and an annular lower bearing surface, one of said bearing surfaces comprising a hemispherical segment, and the other of said bearing surfaces comprising a cylinder, stud means with the head portions thereof in said housing having mating annular bearing surfaces thereon positioned adjacent said bearing surfaces on said housing, and relatively thin plastic bearing inserts interposed between the bearing surfaces of said housing and the bearing surfaces of said stud means, said axis of rotation being coaxial with said annular bearing surfaces of said housing and said stud means, and resilient means urging said stud means against said hemispherical segment.

4. In a joint having a single axis of rotation, a housing forming a portion of said joint and having on its internal surfaces an annular upper bearing surface and an annular lower bearing surface, one of said bearing surfaces comprising a hemispherical segment, and the other of said bearing surfaces comprising a cylinder, stud means with the head portions thereof in said housing having mating annular bearing surfaces thereon positioned adjacent said bearing surfaces on said housing, and relatively thin plastic bearing inserts interposed between the bearing surfaces of said housing and the bearing surfaces of said stud means, said axis of rotation being coaxial with said annular bearing surfaces of said housing and said stud means, and resilient means urging said stud means against said hemispherical segment, said resilient means being seated between the stud head and the bearing insert for the cylindrical bearing surface.

References Cited in the file of this patent

UNITED STATES PATENTS

| | | |
|---|---|---|
| 900,975 | Balloco | Oct. 13, 1908 |
| 2,461,866 | Alldredge | Feb. 15, 1949 |